Oct. 15, 1963 R. B. WILLIAMS, JR 3,106,974
CONTROL CIRCUIT
Filed May 29, 1959 2 Sheets-Sheet 1
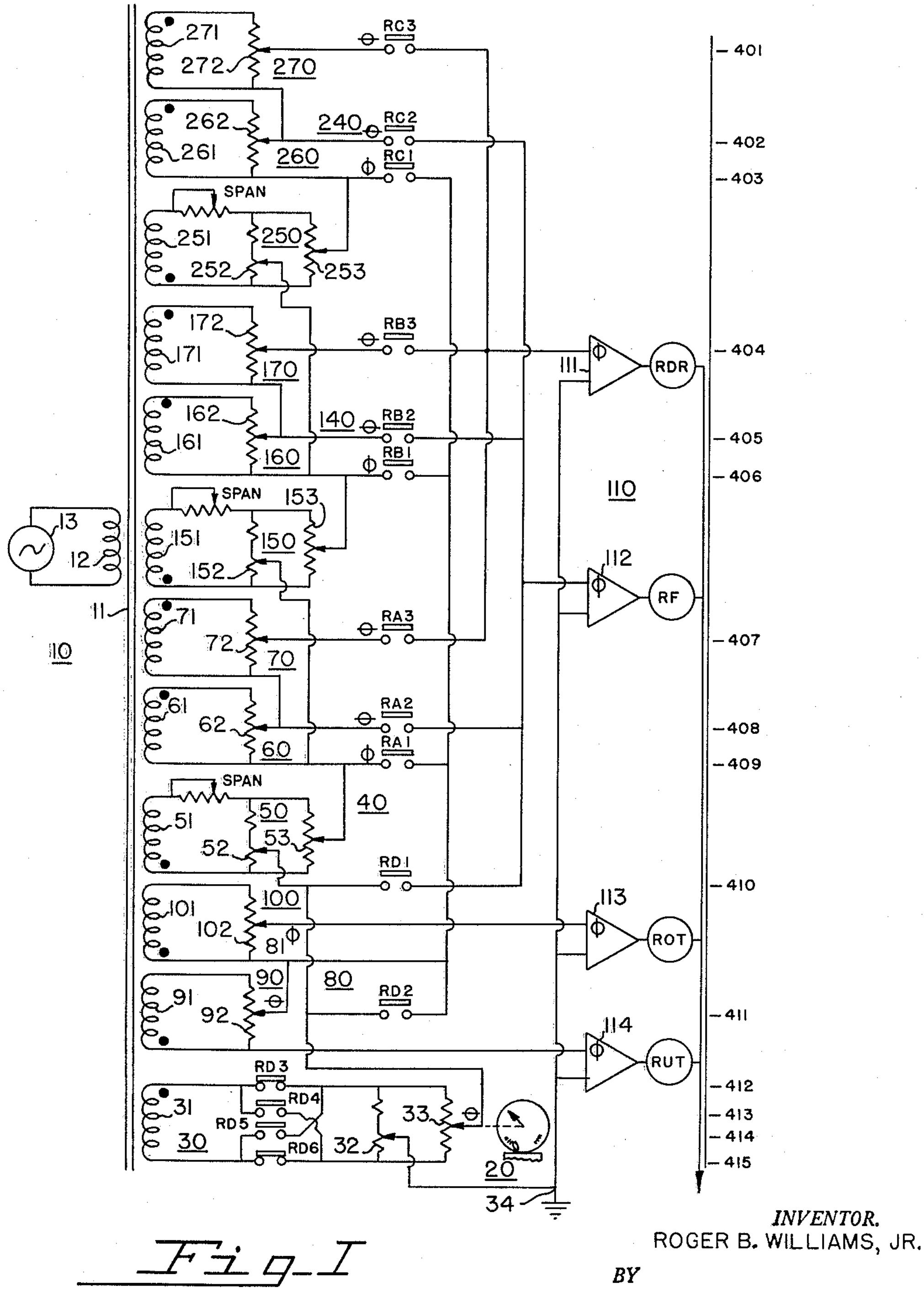
Fig-I
INVENTOR.
ROGER B. WILLIAMS, JR.
BY
Marshall, Marshall & Yeasting
ATTORNEYS

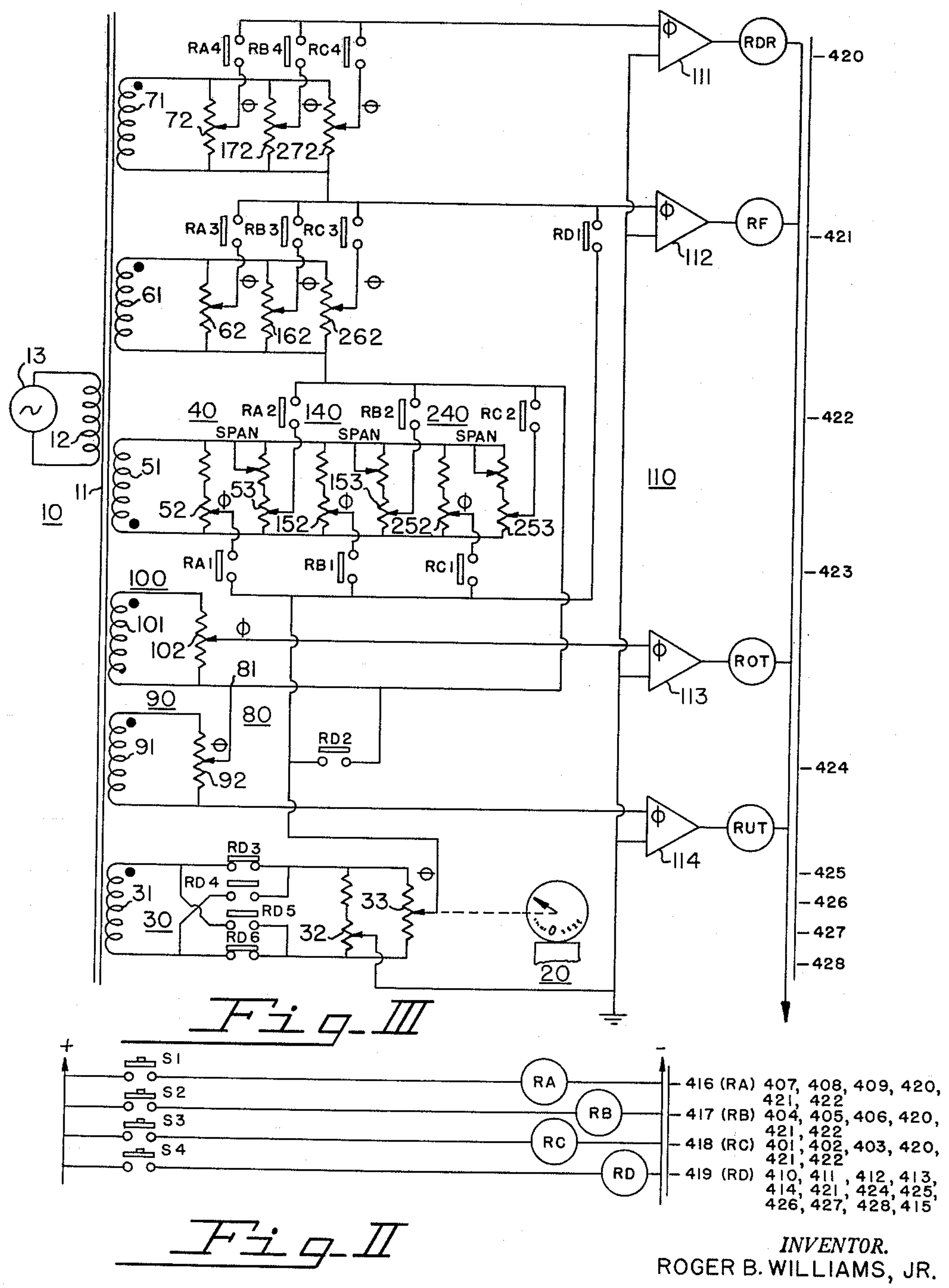
Fig III, Fig II
*INVENTOR.*
ROGER B. WILLIAMS, JR.
*BY*
Marshall, Marshall & Yeasting
ATTORNEYS

United States Patent Office 3,106,974
Patented Oct. 15, 1963

3,106,974
CONTROL CIRCUIT
Roger B. Williams, Jr., Toledo, Ohio, assignor to Toledo Scale Corporation, Toledo, Ohio, a corporation of Ohio
Filed May 29, 1959, Ser. No. 816,987
3 Claims. (Cl. 177—70)

This invention relates to control circuits in general and in particular to control circuits for cutoff systems.

In the field of weighing systems, particularly weighing systems which automatically batch differing amounts of material through separate feeders into a single hopper for distribution, there are a number of cutoff systems and associated circuitry for detecting the proper amounts to be ejected from each of a plurality of feeders into a single hopper. Some of these systems are dependent upon electro-mechanical limit switches and like devices and therefore are subject to a greater number of failures and a greater amount of down time for repair service. Other systems while entirely electronic in their detection stages have thus far utilized various circuitries for feeding into a single electronic output device. This single output device must detect, and react accordingly, to a number of varying signal magnitudes, each containing certain bits of information, present at its input and produce an appropriate desired output signal. Such single output device systems are thus dependent upon the gain of the output device, must be temperature stabilized or compensated which is a difficult process in field applications, and are subject to many other variations which can affect the performance of the entire system.

It is accordingly an object of this invention to provide an improved control circuit which may be utilized with various types of cutoff systems.

It is another object of this invention to provide an improved control circuit which senses a quantity to be measured, compares this sensed signal with a plurality of preset reference signals and provides an operative output signal condition from each of a plurality of single function output devices as the sensed signal passes through various predetermined magnitudes.

Further objects of this invention will become apparent when the following description is taken into conjunction with the accompanying drawings. In said drawings, for illustrative purposes only, there are shown preferred embodiments of this invention. In the drawings the manner in which the windings have been wound upon an associated magnetic core is denoted by the polarity dot convention. That is, in an alternating current transformer system the polarity dot indication on each individual winding denotes like instantaneous points of polarity.

FIG. I is a schematic diagram of a control circuit embodying the teachings of this invention;

FIG. II is a schematic diagram of an elementary programming circuit which may be utilized in conjunction with the apparatus in FIG. I; and FIG. III is a schematic diagram illustrating a second embodiment of this invention.

Referring to FIG. I there is illustrated a preferred embodiment of this invention which comprises in general a power supply 13 supplying a proportional voltage sensing circuit 30, a plurality of preset reference voltage circuits 40, 140 and 240 and a plus and minus tolerance circuit 80. The plurality of output circuits shown generally at 110 have their inputs sequentially connected through the series of relay contacts RA, RB and RC to serial comparing circuits which ocur, against sequentially as the proportional voltage circuit 30 is connected selectively to the reference voltage sources 40, 140 and 240, respectively.

In order to clarify the operation of the control circuit assume that it is applied as a portion of an overall batching control system. A batching process is a process in which predetermined amounts of a number of materials are sequentially fed through individual feeders into a single hopper. The total weight of the material in the hopper at any one time is sensed by a weight sensing transducer which may be, as shown in FIG. I, a potentiometer 33 coupled to the indicating shaft of the scale 20. A batching system must first activate the flow of a first material from a feeder, detect when the weight of the first material is approaching the limit desired and thereby cut down the rate of feeding, and finally cut off the feeding of the first material entirely. Usually there must be what is known in the art as a preact circuit which cuts off the flow of the material while some of the material is still in suspension in the air and not being weighed, anticipating that the amount of material in the air will bring the first material to within a tolerance of the desired weight. Since tolerances are usually accepted except in highly critical weighing, there are also usually a plus tolerance circuit and a minus tolerance circuit which detects, after the first material has finished feeding, if the weight of the first material is within predetermined tolerances. This cycle is repeated for as many times as there are materials to be added to the total batch.

Referring again to FIG. I it may be seen that the proportional voltage circuit 30 comprises a secondary winding 31 of the transformer 10 connected through the contacts RD3, RD4, RD5 and RD6 at lines 412, 413, 414 and 415 to a pair of potentiometers 32 and 33 connected in parallel. The contacts RD3 and RD6 are normally closed contacts while the contacts RD4 and RD5 are normally open contacts. By cross-connecting these contacts between the secondary winding 31 and the potentiometers 32, 33 it may be seen that the phase of alternating voltage applied to the potentiometers 32, 33 may be reversed by opening the contacts RD3, RD6 at lines 412 and 415 and closing the contacts RD4 and RD5 at lines 413 and 414. The reason for reversing the phase to the potentiometers 32, 33 will be discussed hereinafter. As was indicated above, the movable arm of the potentiometer 33 is mechanically or otherwise coupled to the detecting or indicating arm of a scale 20. A material on the scale 20 will thus move the movable arm of the potentiometer 33 so that a voltage is tapped from the potentiometer 33 that is proportional to the weight of the material. The potentiometer 33 is connected in parallel with the zero potentiometer 32 with its movable arm connected to a common or grounding terminal 34 so that the voltage level of the potentiometer 33 may be set at a true zero in accordance with the zero reading of the scale 20.

The first reference voltage circuit 40, which in the assumed batching system would represent a desired amount of a material A, comprises a weight setting circuit 50, a preact circuit 60, and a dribble circuit 70. The weight setting circuit 50 comprises a secondary winding 51 connected to supply a pair of parallel potentiometers 52 and 53. Again the zero potentiometer 52 may have its movable arm adjusted to arrive at a true zero in accordance with the reading of the scale 20. The preact circuit 60 comprises a secondary winding 61 of a transformer 10 supplying a potentiometer 62. The dribble circuit 70 comprises a secondary winding 71 of the transformer 10 supplying a potentiometer 72.

The reference voltage circuit 140, for settings in accordance with a material B to be added to the batch, comprises a weight setting circuit 150, a preact circuit 160 and a dribble circuit 170. The weight setting circuit 150 comprises a secondary winding 151 of the transformer 10 supplying the parallel potentiometers 152 and 153. Again the zero potentiometer 152 is utilized to set the circuit 140 to the true zero with respect to ground and the scale 20. The preact circuit 160 comprises a secondary winding 161 supplying a potentiometer 162. The dribble circuit 170 comprises a secondary winding 171 of the transformer 10 supplying a potentiometer 172.

The reference voltage circuit 240 comprises a weight setting circuit 250, a preact circuit 260 and a dribble circuit 270. The weight setting circuit 250 comprises a secondary winding 251 of the transformer 10 connected to supply a pair of paralleled potentiometers 252 and 253. Again the zero potentiometer 252 is utilized to set the reference voltage circuit 240 to true zero with respect to ground and the scale 20. The preact circuit 260 comprises a secondary winding 261 of the transformer 10 supplying a potentiometer 262. The dribble circuit 270 comprises a secondary winding 271 supplying a potentiometer 272.

The zero setting potentiometers 32, 52, 152 and 252 are utilized to obtain a zero setting by introducing voltages of the proper phase into the respective series comparing circuits so that the total or vector sum of these voltages equals zero when the scale 20 indicates zero.

The span potentiometers connected in series with the weight setting circuit potentiometers are adjustable to control the amount of voltage applied to said weight setting potentiometers, thereby determining the amount of weight that an individual weight setting potentiometer may represent in terms of a reference voltage.

Referring to FIG. II there is shown an elementary programming circuit which may be utilized in conjunction with the apparatus of FIG. I. The programming circuit of FIG. II comprises the switches $S_1$, $S_2$, $S_3$ and $S_4$ each respectively serially connected with the relays RA, RB, RC and RD at lines 416, 417, 418 and 419. The switches may be of the pushbutton variety so that when a pushbutton is depressed the switch energizes its associated serially connected relay. Each of the relays are of the multiple contact type with the relay RD at line 419 having 4 normally open contacts and 2 normally closed contacts at lines 410, 411, 413, 414 and 412, 415 in FIG. I.

Assume that the batching is to be done by successively feeding the materials A, B and C through the feeders into a single hopper. By depressing the pushbutton for the switch $S_1$ at line 416 the relay RA at line 416 would be energized. Therefore, all of the RA contacts of FIG. I at lines 407, 408 and 409 which have been normally open are now closed. Assume further that the potentiometer 53 of the circuit 50 has been set at a desired level of reference voltage which is proportional to the weight of material A that is needed in the hopper. The closing of the contacts RA at lines 407, 408 and 409 now provides a series comparing circuit connecting the potentiometer 33, the potentiometer 53, the potentiometer 62 and the potentiometer 72 in series between ground and the input of a first output device 111. The other input of the amplifier 111 is grounded. When setting the potentiometer 53 to the desired weight of material A, the preact potentiometer 62 is set at a voltage proportional to the weight of matter A that is still in suspension or in the air upon final cutoff. The dribble potentiometer 72 is also set at that time to the weight prior to the final cutoff of material A where it is desired to change the feeding of the material A from a fast feed to a slow or "dribble" feed which allows greater acuracy in the final cutoff.

The closing of the contacts RA at lines 407, 408, and 409 in FIG. I connected a signal comparing circuit in which the signal voltages on the potentiometers 33, 53, 62 and 72 are compared. It is now necessary to note the polarity dot convention as applied to the windings 31, 51, 61 and 71. With the voltages from the potentiometers connected as described it may be seen that the voltage on the potentiometer 33 is 180° out of phase with the voltage on the potentiometer 53. The voltage on the potentiometer 33 will be designated as the theta ($\theta$) phase and the voltage on the potentiometer 53 will be designated as the phi ($\phi$) phase. Therefore it may be seen that if the voltages on the potentiometers 33 and 53 were exactly idenitcal the total magnitude in sum would be zero. Since the preact and the dribble voltages are to effect operations prior to the reaching of the desired weight of material A in the hopper they are of the theta ($\theta$) phase and thus subtract from the phi ($\phi$) phase voltage of the weight setting on the potentiometer 53.

Assume now that the material A is being fed into the hopper. The movable arm on the potentiometer 33 moves up in accordance with the increasing weight of the material A and thereby produces a theta ($\theta$) phase voltage which is proportional to the increasing weight. When the voltage on the potentiometers 33, 53, 62 and 72 totals zero this zero signal is applied to the phi ($\phi$) input of the phase sensitive amplifier or null detector 111. When the input on such device goes to zero its output is also reduced to zero. Therefore a relay RDR, which is so designated as a cutoff, or relay dribble cutoff is deenergized. It will be noted that all of the relays for the dribble cutoff, the final cutoff, the over tolerance detector and the under tolerance detector are energized at the start of the cycle. Therefore the normal output signal condition for the plurality of output devices 110 is with their respective relays energized in the embodiment shown in FIG. I. Although other output signal conditions may be utilized, the operation as shown in FIG. I makes the normal energization of the relays a safety factor in the operation of the entire batching system. That is, if for any reason the system has a failure within it, such as a power supply failure, all the output relays are deenergized and the cycle is immediately stopped until the system is repaired.

There are many phase sensitive amplifiers and null detectors known to those skilled in the art that are commercially available so they are represented on the diagram for the purpose of simplicity with the usual symbolic triangle for the amplifier with the phase to which it is sensitive designated at the input.

Referring again to FIG. I, since the dribble relay RDR has been deenergized the feeding of the material A into the hopper has been slowed and will reach a final cutoff when the sum of the voltages on the potentiometer 33, the potentiometer 53 and the potentiometer 62 equals zero. This zero voltage condition is applied through the contact $RA_2$ to the phi ($\phi$) input of the second cutoff or final cutoff amplifier 112 and its associated normally energized final cutoff relay RF. The material A that is still in the air after the individual feed has been cutoff will now fall on the scale 20 in the hopper A and the potentiometer 33 will reach a steady state voltage until the necessary cycle for the material B is started.

The voltage on the potentiometer 33 is now added with the voltage on the potentiometer 53 through the contacts RAI at line 409 in a tolerance comparing circuit to a common terminal 81 of the tolerance circuits 80. To obtain a plus tolerance reading a voltage is set on the potentiometer 102 of the plus tolerance circuit 100 which is proportional to the amount of overweight that may be allowed. This is applied in series with the voltages from the potentiometers 33 and 53 to the phi ($\phi$) input of the phase sensitive amplifier or null detector 113. If the weight of the material has not provided a proportional voltage on the potentiometer 33 which is larger than the sum of the voltages on the potentiometers 53 and 102 there will still remain a slight phi ($\phi$) signal at the input of the amplifier 113 which maintains the energization of the over tolerance relay ROT. Therefore, there will be no visual or audible or other indication of an overweight in associated indicating circuitry (not shown). The associated indicating circuitry may be so connected to provide a visual, audible or other indication that the weight is within tolerance. Similarly, the theta ($\theta$) voltage on the potentiometer 92 of the minus tolerance circuit 90 is applied to the input of the phase sensitive amplifier 114 in sum total with the voltages on the potentiometers 33 and 53 to detect a weight which is under tolerance. However, in this case the relay RUT will be deenergized since if the weight on the scale 20 is within tolerance the final signal presented to the input of the amplifier 114 will be of the theta ($\theta$) phase and will turn the amplifier 114 off.

If the batching system has operated properly in feeding the weight of material A into the hopper the switch $S_1$ at line 416 is opened and the switch $S_2$ at line 417 is then closed to start the cycle for the material B. Since the operation for the cycles of materials B and C and the operation of the circuits 140 and 240 is identical to the operation of cycle A and the operation of circuit 40, the description of further circuit operation is deemed unnecessary.

An additional feature of the control circuit illustrated in FIG. I is the discharging sequence. To discharge the material from the hopper the switch $S_4$ at line 419 may be closed energizing the relay RD at line 419. This closes the contacts RD1, RD2, RD4 and RD5 at lines 410, 411, 413 and 414, respectively, of FIG. I. It opens the back contacts RD3 and RD6 at lines 412 and 415. As explained hereinbefore this reverses the phase of the voltage supplied to the potentiometer 33. The closure of the contacts RD1 and RD2 at lines 410 and 411 connects the reversed phase voltage of the potentiometer 33 to the input of the output device 114 thereby allowing reenergization of the output relay RF that had been deenergized. As the weigh hopper is discharged the voltage output of the potentiometer will proceed to zero, thereby deenergizing the relay RF. This may be used to indicate that the scale hopper is empty and that a new batching process may begin.

Since this is an electrical control system it must be recognized that there are many ways of changing the magnitudes of the various voltages appearing on the potentiometers, if so desired, before comparing them in a comparing circuit at the input of the amplifiers. For example, an alternating signal may be readily transformed to a signal having a lower or higher magnitude. Therefore, it must be noted that equal magnitudes of the various voltages and senses of voltages is not always required but the voltages may have a predetermined signal relationship in order to provide a proper signal or lack of a signal to said amplifiers.

Referring now to FIG. III there is shown a second embodiment of the teachings of this invention in which like parts of the circuit as used in FIG. I have retained their same character designation. In general the apparatus illustrated in FIG. III differs from the apparatus illustrated in FIG. I in that the individual weight settings are made individually in FIG. I and the weight settings of FIG. III are made accumulative. That is, if the various weights for materials A, B and C were to be 30, 40 and 50 pounds respectively, the potentiometers for A, B and C of FIG. I would have been set at voltages proportional to 30, 40 and 50 pounds. In the apparatus illustrated in FIG. III, assuming the same poundage requirements, the material A potentiometer would be set at 30 pounds, the material B potentiometer would be set at 70 pounds, and the material C potentiometer would be set at 120 pounds.

To accomplish the above result each of the pairs of weight setting potentiometers and its associated zero calibrating potentiometer are connected in parallel in the apparatus in FIG. III. That is, the weight setting potentiometers comprising the pair 52, 53 the pair 152, 153, and the pair 252, 253 have been connected in parallel and supplied by the primary winding 51. The preact potentiometers 62, 162 and 262 have been connected in parallel and supplied by the secondary winding 61. The dribble potentiometers 72, 172 and 272 are connected in parallel and supplied by the secondary winding 71.

The same program circuit as shown in FIG. II may be utilized with the apparatus in FIG. III with the exception that the RA, RB and RC relays at lines 416, 417, and 418 now each include four contacts at lines 421, 422, 423 and 424. As may be seen in FIG. III when the contacts RA1, RA2, RA3, and RA4 at lines 421, 422, 423 and 424 are closed the circuit including the voltages on the potentiometers 33, 53, 62 and 72 are added in a comparing circuit to the input of the phase sensitive amplifier or null detector 111. Thus the operation of the circuit of FIG. III is identical to the operation of the circuit of FIG. I in totaling the proportional and the preset reference voltages in a comparing circuit and applying same to the input of the various output amplifiers as the program circuit of FIG. II sequentially switches the respective potentiometers into comparing circuits.

Since the further operation of the apparatus in FIG. III is identical with the operation of the apparatus in FIG. I further description is deemed unnecessary.

In summary there has been disclosed a control circuit which comprises a plurality of signal circuit means and a plurality of output circuit means. Each of the signal circuit means comprises a proportional circuit means which provides a voltage proportional to a quantity to be measured, a reference circuit means which provides a plurality of adjustable preset reference voltages, a signal comparing circuit means which compares the magnitudes of predetermined combinations of the plurality of preset reference voltages with respect to the proportional voltage, tolerance reference voltage means, and tolerance comparing circuit means. Switching means are used which are operative to sequentially connect the plurality of output circuits to each of the signal comparing circuits and the tolerance comparing circuits of the plurality of signal circuits. A first of the output circuits provides a first operative output signal condition in response to a first condition of equal magnitudes of said proportional voltage and the vector sum of a predetermined number of the plurality of preset reference voltages. A second of the output circuits provides a second operative output signal condition in response to a second condition of equal magnitudes of said proportional voltage and the sum of a second predetermined number of said plurality of preset reference voltages. The plurality of output circuits also includes at least one of a pair of tolerance output circuits. The pair of tolerance output circuits comprises an over-tolerance circuit and an under-tolerance circuit. Each of the tolerance output circuits are connected, in series in the embodiment shown, to the tolerance comparing circuit so that it provides an operative output signal condition in response to a condition of equal magnitudes of the proportional voltage and one of the plurality of preset reference voltages plus one of the tolerance reference voltages. As stated hereinbefore it is not necessary in other embodiments of the invention to require equal magnitudes of the various voltages before providing an output signal condition but merely that the voltages must reach a predetermined signal relationship which is of itself an enabling signal to cause operation of the output circuits. This may be accomplished by voltage dividing networks, other potentiometers, etc., or other methods well known to those skilled in the art, that reduces or enlarges the voltages with respect to each other so that they may operate the sequentially connected output circuits.

It is to be noted that a direct-current version of the teachings of this invention could be readily adapted from the apparatus disclosed in FIGS. I and III. That is, the potentiometers may be supplied with direct-current voltages with a positive voltage representing a first phase and a negative voltage representing a second phase. It is to be further noted that the "sums of the voltages" referred to herein when adding or subtracting the various voltages in the respective signal circuits refers to the instantaneous "vector sum" of the voltages thereby covering both addition and subtraction.

In conclusion, it is pointed out that while the illustrated examples constitute preferred embodiments of my invention, I do not limit myself to the details shown since modification of the same may be varied without departing from the spirit and scope of this invention.

I claim as my invention:

1. In an ingredient mixing system, control circuitry for measuring the flow of an ingredient into a hopper comprising in combination; a condition potentiometer having a tap differentially positionable in response to the increase in weight of an ingredient in a hopper and providing an output voltage proportional to the weight of said ingredient, means producing a first voltage of opposite polarity to that of said condition potentiometer and proportional to the final weight of the ingredient desired, means producing a second voltage of polarity similar to that of said condition potentiometer and proportional to the amount of ingredient in suspension after an indication of the desired weight of the ingredient is registered on said condition potentiometer and compensating for said inflight amount of ingredient, means producing a third voltage of polarity similar to that of said condition potentiometer voltage and proportional to said first voltage, means producing a fourth voltage of opposite polarity to that of said condition potentiometer voltage and proportional to the amount of overweight permissible of the loading ingredient, means producing a fifth voltage of polarity similar to said condition potentiometer voltage and proportional to the amount of underweight loading permissible, first switching means operably connecting in a first signal circuit said condition potentiometer and said first, second and third voltage producing means and obtaining a resultant voltage therefrom, a first signal output means operatively connected in circuit with said first switching means and responsive to a balanced resultant voltage from said first signal circuit to decrease the delivery rate of said ingredient to said hopper, second switching means operably connecting in a second circuit said condition potentiometer and said first and second voltage producing means and producing the resultant voltage therefrom, second signal output means operatively connected in circuit with said second switching means to totally cut off the feeding of the ingredient into a hopper, third switching means operably connecting in a third signal circuit said condition potentiometer and said first and fourth voltage producing means for producing a resultant voltage therefrom, a third signal output means operatively connected in circuit with said third switching means and responsive to the resultant voltage therefrom to indicate an excess of ingredient in said hopper, a fourth switching means operably connecting in a fourth signal circuit said condition potentiometer and said first and fifth voltage producing means and producing a resultant voltage therefrom, a fourth signal output means operatively connected in circuit with said fourth switching circuit means responsive to the resultant voltage therefrom to indicate a deficiency of ingredient in said hopper.

2. A batching control circuit for metering the flow of ingredients into a hopper, the combination comprising, a plurality of output circuit means, a condition potentiometer having a tap movable in response to a change in weight of an ingredient flowing into a hopper and providing a voltage proportional to the weight of said inflowing ingredient, a first plurality of potentiometers each having a tap movable to provide a preset reference voltage opposite in phase to the voltage of said condition potentiometer and representative of the desired amount of the various ingredients to flow into the hopper, a second plurality of potentiometers each having a movable tap providing a preset reference voltage in phase with said voltage of said condition potentiometer and representative of the amount of ingredient which is to flow into the hopper at a reduced rate in anticipation of the proximity of a final cutoff thereof, a third plurality of potentiometers each having a tap movable to provide a preset reference voltage in phase with said voltage from said conditional potentiometer, and compensating for the amount of inflight ingredient by reducing the preset voltage reference of said first plurality of potentiometers by the amount of inflight ingredient at the time of final cutoff, first switching means sequentially connecting selective ones of each of said first, second and third plurality of potentiometers in circuit with said condition potentiometer, and second switching means operative to connect individual ones of said plurality of output circuits to predetermined points of each of said signal comparing circuits, a first of said output circuits responsive to a condition of algebraic equality between the voltages of the condition potentiometer and one each of said first, second and third potentiometer voltages connected in circuit therewith, and providing a first output signal condition in response thereto to effect a reduced feed rate of the ingredient, a second of said output circuits responsive to a condition of algebraic equality between the voltages of said condition potentiometer and one each of said first and third plurality of potentiometers, and providing a second output signal condition in response thereto to effect a final cutoff of the feed of said ingredient.

3. A batching control circuit as defined in claim 2 which includes a tolerance detecting means comprising, a pair of tolerance reference voltage means; a pair of tolerance output circuits; first switching means operable to connect in a first tolerance checking circuit said condition potentiometer, a first tolerance reference voltage, and one of said first plurality of preset reference voltages, said first tolerance checking circuit providing an output signal in response to a condition of algebraic equality between the last mentioned voltages, a first of said tolerance output circuits operably connected and responsive to the algebraic equality condition of said first tolerance checking circuit, second switching means operable to connect in a second tolerance checking circuit said condition potentiometer, a second tolerance reference voltage means and one of said first plurality of preset reference potentiometers, said second tolerance checking circuit providing an output signal in response to a condition of algebraic equality between the last mentioned voltages, and a second of said tolerance output circuits operably connected and responsive to the algebraic equality condition of said second tolerance checking circuit.

References Cited in the file of this patent

UNITED STATES PATENTS

| | | |
|---|---|---|
| 2,868,491 | Thorsson et al. | Jan. 13, 1959 |
| 2,938,701 | Thorsson | May 31, 1960 |

FOREIGN PATENTS

| | | |
|---|---|---|
| 569,975 | Canada | Feb. 3, 1959 |
| 1,163,040 | France | Apr. 21, 1958 |